United States Patent [19]

Hasegawa et al.

[11] Patent Number: 5,933,839
[45] Date of Patent: Aug. 3, 1999

[54] DISTRIBUTED FILE SYSTEM FOR RENEWING DATA WITH HIGH INTEGRITY

[75] Inventors: Tetsuo Hasegawa, Tokyo; Toshibumi Seki, Yokohama; Hiroshi Kaibe, Fuchu, all of Japan

[73] Assignee: Kabushiki Kaisha Toshiba, Kawasaki, Japan

[21] Appl. No.: 08/578,051

[22] Filed: Dec. 22, 1995

Related U.S. Application Data

[63] Continuation of application No. 08/278,809, Jul. 22, 1994, abandoned.

[30] Foreign Application Priority Data

Jul. 23, 1993 [JP] Japan .................................. 5-183076

[51] Int. Cl.⁶ .................................................. G06F 17/30
[52] U.S. Cl. .................................... 707/204; 395/182.04
[58] Field of Search .................................... 707/204, 201; 395/182.03, 182.04

[56] References Cited

U.S. PATENT DOCUMENTS

| | | | |
|---|---|---|---|
| 4,575,827 | 3/1986 | Kulakowski | 365/230.01 |
| 4,807,122 | 2/1989 | Baba | 711/100 |
| 4,827,462 | 5/1989 | Flannagan et al. | 369/32 |
| 5,119,291 | 6/1992 | Flannagan et al. | 711/4 |
| 5,134,619 | 7/1992 | Henson et al. | 371/40.15 |
| 5,148,432 | 9/1992 | Gordon et al. | 395/182.05 |
| 5,233,618 | 8/1993 | Gilder et al. | 395/182.04 |
| 5,257,367 | 10/1993 | Goodlander et al. | 707/204 |
| 5,317,731 | 5/1994 | Dias et al. | 707/8 |
| 5,408,644 | 4/1995 | Scneider et al. | 395/180 |
| 5,448,719 | 9/1995 | Schultz et al. | 395/182.03 |
| 5,586,248 | 12/1996 | Alexander et al. | 395/182.2 |
| 5,634,111 | 5/1997 | Oeda et al. | 711/153 |

OTHER PUBLICATIONS

Schember et al "File Design for Microcomputer Databases" in S. Lee, ed. "Microcomputer Design and Applications" Academic Press, pp. 81–95, 1977.

*Primary Examiner*—Jack M. Choules
*Attorney, Agent, or Firm*—Oblon, Spivak, McClelland, Maier & Neustadt, P.C.

[57] ABSTRACT

A high-reliability file system which surely keeps multiple file data on one drive even if some drives have failed. If renewal of a plurality of blocks of a disk by data in a buffer is necessary, a buffer manager renews the disk by all the data in the buffer which are to be renewed in the future. Flush management is carried out by the drive and the buffer manager. If another drive is "examining" or "renewing" when a flush (renewal) is to be executed, a sequencing means temporarily restrains the buffer manager from starting the flush.

17 Claims, 12 Drawing Sheets

[OPERATION DEMAND TO DRIVE 1S]

| OPERATION NUMBER | ADDRESS OF BLOCK RENEWED |
|---|---|
| 1 | 1, 2, 3 |
| 2 | 4, 5, 6 |
| 3 | 7, 8, 9 |

*FIG. 5*

[INITIAL STATUS OF BUFFER 1D]

| BLOCK ADDRESS | RENEWAL NECESSITY | DATA CONTENTS | BLOCK ADDRESS | RENEWAL NECESSITY | DATA CONTENTS |
|---|---|---|---|---|---|
| EMPTY | | | EMPTY | | |
| EMPTY | | | EMPTY | | |
| EMPTY | | | EMPTY | | |
| EMPTY | | | EMPTY | | |

*FIG. 6*

[STATUS OF BUFFER 1D AFTER OPERATION 1]

| BLOCK ADDRESS | RENEWAL NECESSITY | DATA CONTENTS | BLOCK ADDRESS | RENEWAL NECESSITY | DATA CONTENTS |
|---|---|---|---|---|---|
| 1 | NECESSARY | . . . | EMPTY | | |
| 2 | NECESSARY | . . . | EMPTY | | |
| 3 | NECESSARY | . . . | EMPTY | | |
| EMPTY | | | EMPTY | | |

*FIG. 7*

[STATUS OF BUFFER 1D AFTER OPERATION 2]

| BLOCK ADDRESS | RENEWAL NECESSITY | DATA CONTENTS | BLOCK ADDRESS | RENEWAL NECESSITY | DATA CONTENTS |
|---|---|---|---|---|---|
| 1 | NECESSARY | . . . | 5 | NECESSARY | . . . |
| 2 | NECESSARY | . . . | 6 | NECESSARY | . . . |
| 3 | NECESSARY | . . . | EMPTY | | |
| 4 | NECESSARY | . . . | EMPTY | | |

*FIG. 8*

[STATUS OF BUFFER 1D AFTER OPERATION 3]

| BLOCK ADDRESS | RENEWAL NECESSITY | DATA CONTENTS | BLOCK ADDRESS | RENEWAL NECESSITY | DATA CONTENTS |
|---|---|---|---|---|---|
| 9 | NECESSARY | . . . | 5 | NO | . . . |
| 2 | NO | . . . | 6 | NO | . . . |
| 3 | NO | . . . | 7 | NECESSARY | . . . |
| 4 | NO | . . . | 8 | NECESSARY | . . . |

*FIG. 9*

[OPERATION CAREER TABLE]

| OPERATION NUMBER | BLOCK NUMBER TO BE RENEWED |
|---|---|
| 1 | 1, 2, 3 |
| 2 | 4, 5, 6 |
| 3 | 7, 8, 9 |
| 4 | |
| 5 | |
| 6 | |

DATA IN DISK BUFFER

| BUFFER BLOCK NUMBER | OPERATION NUMBER | BLOCK ADDRESS | RENEWAL NECESSITY | DATA CONTENTS |
|---|---|---|---|---|
| 1 | 1 | | | |
| 2 | 1 | | | |
| 3 | 2, 3 | | | |
| 4 | 2 | | | |
| 5 | 3 | | | |
| 6 | | | | |
| 7 | | | | |

DISTRIBUTED FILE SYSTEM FOR RENEWING DATA WITH HIGH INTEGRITY

This application is a Continuation of application Ser. No. 08/278,809, filed on Jul. 22, 1994, now abandoned.

BACKGROUND OF THE INVENTION

This invention relates to the improvement in a file system which stores data, and more particularly to a file system which excels in reliability.

Most computers have internal storage and external storage. Internal storage requires a continuous electric power supply from the outside in order to store data. The main memory RAM is typical of such an internal storage. External storage is usually a magnetic disk or an optical magnetic disk. Concerning external storage, the recording medium may be removed. A multitudinous block including many pieces of data is called the unit of access and is usually formed on the medium.

For example, a floppy disk has 2 surfaces, each surface respectively having 80 tracks which are arranged in a concentric circle arrangement, each track being divided into 16 sectors and a block corresponding to one or more continuous sectors. In a fixed (hard) disk drive, a recording medium is the firm disks which are laminated like a cylinder with many surfaces. Moreover, in a fixed disk drive, a term "track" is not used and a term "cylinder" is used.

In most cases, the single operation to write data on a disk renews a plural number of blocks on a medium. A first reason is because the size of a block (for example 256 bytes) is usually far smaller than a data quantity of a single operation. For example, to store a document consisting of the several pages which are edited on a computer, a lot of blocks or sectors are necessary. The second reason is because management of data on a medium is usually executed in the unit of a file and, moreover, the file data is stored on different areas of the medium like the contents of a book and includes FAT (File Allocation Table) and directory information to locate the data.

A file system, which is the generic name for external storage or a control procedure of this external storage, also requires management information like FAT (File Allocation Table) and directory information. For this reason, when a file is renewed, even just to lengthen a file only 1 sector, the FAT and directory information also must be renewed, in addition to the data which becomes part of a file.

In a file system, a buffer is usually used with a fixed area formed in memory to temporarily accumulate the data which is to be written to a medium. A buffer may use the main memory and may be allocated on a sub-computer to control the drive. For example, in the system composed of a disk and a buffer, when the data which is recorded in a block on a disk needs to be changed, contents of changed data are not written in a disk directly but are stored on the buffer temporarily. Before a system shuts down, data block(s) in the buffer (hereinafter called buffer block) must be written in a disk for renewal. After such a buffer block accumulates data to a certain extent, practical disk access is executed, so that frequency of disk access is decreased and processing can be made efficient.

When the buffer has been filled up with data which is not yet written on a disk and new data cannot be written in the buffer, a disk is renewed by buffer blocks. Then, the process is repeated and new data is stored in the area of the buffer which was renewed.

These days a file system with said buffer is used generally whereas, conventionally, only a single drive (not duplicated) was used to store a file. The computer which does not save data to a number of storage media frequently suffers a loss of data arising from failure of a drive. Typical troubles of a drive include a loss of power, damage to a control circuit, a head crash and so on. The most unfortunate result arising from the failure is that a medium is left with the "writing unfinished".

In a "writing unfinished", state only a portion of the block is renewed and the remaining block is unrenewed. The portion of the partially-renewed data that has been renewed, are written to the disk, may contradict the portion of the file that has not been renewed also the information in the FAT concerning the file and its directory may not correspond to the actual area used on the disk. But, when a drive fails, the renewed data in the file not written to the disk may be lost or may become difficult to restore.

Moreover, other examples of "writing unfinished" states are as follows. That is, when only FAT is renewed and directory information is not renewed, the management data loses consistency. One other example is that, when continuous blocks constitute a part of a single file, data of the specific block is renewed, and data of a next block is unrenewed.

Consistency is naturally lost between old data and new data. Restoration of a file with unrenewed data mixed with renewed data is far more difficult than restoration of the file with wholly unrenewed data. One cause of this difficulty is that it is difficult to specify the old part and the new part. Moreover, another cause of inconsistent data (especially, in magnetic disks) is that when a head falls into the disk, the data on a medium is destroyed. This is because a magnetic field for writing which eminates from a head becomes a false "usual" status and damages information on a magnetic surface.

When the management data to access the file contents is lost, the entire file is lost. Especially, when a system file of a computer is lost, a computer system cannot be started and a diagnosis of the defect and a restoration become impossible.

Leniency for such loss of data differs by field. For example, in a field of arrangement of veil vote calculation, experimental data, document making and etc., it is possible to start over again from old data. Anti-accident reliability is not required so much in such fields. On the other hand, disappearance of data is not permitted in a field such as control of a large plant and control of a traffic system or a bank account management, and starting over again is not possible in such fields. In banking, since loss of data instantly causes danger and confusion of rights and duties, anti-accident reliability is required to a high degree.

In recent years, accompanied with downsizing of computer systems, systems used in the field which do not require anti-accident reliability have come to be used in the field which does require high anti-accident reliability. For example, a UNIX file system, which is utilized abundantly on a small-sized computer and does not consider anti-accident reliability, has come to be utilized in the field which requires anti-accident reliability. Therefore, improvement of anti-accident-reliability is an important subject.

Mirroring and a distributed file system is one way to prevent loss of a file and improve anti-accident reliability. Mirroring is a technique which connects plural drives with a single computer and completely writes the same data to each drive. Moreover, a distributed file system is a system which connects plural drives to a computer, which usually stores files of identical contents on plural drives.

According to such a multiple file system, since the same data is multiply stored in some drives, even though a partial drive fails, restoration of files and execution of work is possible by using the file which was left in the remaining drive.

However, a multiple file system has an unresolved problem in that a "writing unfinished" state can occur by plural drives at the same time. This is because an entry to the plural drives could occur at the same time in an existing file system. In addition, this problem may also occur because a unit of the buffer block, which renews blocks of a drive, was saved to the wrong file.

For example, when 2 buffer blocks were respectively operated on 2 drives by a single operation, the condition, which only 1 block is renewed and another block is not renewed by a mutual drive, frequently occurred. An especially unfortunate condition occurs when a "writing unfinished" state happens on all drives having the same file. In this case, all plural files of identical contents are lost. In the prior art, the danger of losing all files has made a file system less reliable.

SUMMARY OF THE INVENTION

An object of the present invention is to provide solutions to the problems of the prior art described above. It is an object of the present invention to provide a file system which is reliable. To put it concretely, it is an object of the present invention to provide a file system which generates blocks which do not contradict after a "writing unfinished" state. In addition, it is an object of the present invention to provide the file system with one file having identical contents of the drive medium in case of drive failure.

In addition, it is an object of the present invention that the file system processes data efficiently. In addition, it is an object of the present invention that the file system has simple construction. In addition, it is an object of the present invention that a defect influences only the occurring parts and does not reach other parts. In addition, it is an object of the present invention that the file system is reliable and easy to introduce into a conventional file system.

To attain the above objects, the file system according to the present invention includes the following:

The invention according to a first embodiment is a file system comprising: a nonvolatile storage device having a recording medium; plural blocks which are constructed on said medium as units of access, a volatile memory device comprising a buffer; a buffering means for temporarily storing buffer blocks to be written on each of said blocks; examining means for deciding the necessity of renewal of said medium by said buffer blocks; a renewing means for continuously renewing said blocks of the drive by all said buffer blocks on the said buffer when said renewal was regarded as a necessary.

The file system according to the first embodiment performs renewal by all block data continuously. Thus, a condition of a "writing unfinished" state is limited to a duration of renewal and does not generate inconsistency between blocks of a file between one renewal and a next renewal. For this reason, even though a drive breaks down in an instant except for renewal, consistency between each of the blocks in a file is maintained.

In addition, the file system according to the first embodiment performs renewal on the buffer by all block data and does not require the complicated management of managing block data for every operation distinctively.

In addition, the file system according to the first embodiment is able to perform renewal by all block data at once.

For this reason, to perform entire renewal at once when a load of the CPU is low, and to avoid renewal when a load of the CPU is high, resolves the inconvenience of imposing high loads on the CPU.

The invention according to a first variant is a file system of the first embodiment (but may also be applied to a second embodiment, discussed below), wherein said examining means investigates whether room for new data exists on the buffer, when new data based on a single operation are written in the buffer, and decides that said renewal is required when room does not exist on the buffer.

In the invention according to the first variant, since the examining means judges the existence of room prior to entries of new data to the buffer, it is possible to evade the problem that renewal is performed for half of the plural block data corresponding to a single operation.

The invention according to a second variant is a file system of the first embodiment (but, may also be applied to the second embodiment discussed below) comprising: a sequencing means for carrying renewal into effect to each drive sequentially and avoiding renewal of drives at the same time.

In the invention according to the second variant, since sequencing means staggers timing of renewal, a condition of "writing unfinished" does not occur in plural drives at the same time. For this reason, data of plural drives are not lost at the same time and original data is left in at least one drive.

The invention according to a third variant is a file system of the second variant, wherein said sequencing means investigates whether a first drive in renewal exists when said renewal performs in a second drive, and deters renewal for a first drive when a second drive, in a state of renewal, already exists. The invention of the third variant executes renewal for a drive of said one drive when a drive in another renewal does not exist.

In the invention according to the third variant, since the sequencing means avoids overlap of time of renewal by investigating every renewal and detects a drive in another renewal, sequencing can be performed with certainty.

In addition, since the invention of the third variant can be realized by giving control of a renewal opening to a sequencing means and the hardware which performs renewal itself, a process can utilize those of the prior art. Therefore former equipment can be utilized effectively.

The invention according to a fourth variant is a file system of the third variant, wherein said sequencing means waits for a fixed time period when more than one drive is renewing, investigates again whether a drive is renewing and makes the renewing means renew when other drives are renewing.

In the invention according to the fourth variant, since sequencing means realizes sequencing by waiting for a fixed time period, a human supervisor for allotting timing of renewal is not required.

The invention according to a fifth variant is a file system of the fourth variant, wherein said sequencing means awaits for a fixed time if a drive under said examination was detected and it is possible to set the waiting time for renewal and waiting time for examination separately.

In the invention according to the fifth variant, since it is possible to set the waiting time for renewal and the waiting time for examination freely according to a peculiarity of a drive, the entire management process runs more efficiently.

The invention according to a sixth variant is a file system of the fifth variant, respectively, wherein said sequencing means sets a flag showing a status of each drive to "examining", "renewing" and other conditions corresponding to a condition of a drive, and investigates a flag of the other drives when renewal is to be performed.

In the invention according to the sixth variant, even though hardware of each drive differs, the sequencing means can detect a drive under renewal and under examination by referring to the flag of other drives. Moreover, when the sequencing means is integrated into each drive, the individual drive which is about to be renewed refers to a flag. For this reason, a supervisor of higher priority which controls each drive need not be provided.

The invention according to a seventh variant is a file system of the second variant, wherein said sequencing means is established individually on each drive.

In the invention according to the seventh variant, since the sequencing means is distributed in each drive of the file system, break down of one drive does not influence the other drives.

In addition, when the sequencing means is composed, as a supervisor of the higher rank for controlling a drive, break down of the sequencing means stops management in each drive. By the invention of the seventh variant, such a stop can be avoided.

The invention according to an eighth variant is a file system of the seventh variant, wherein each said sequencing means performs said examination by collecting information concerning a condition of other drives by way of a communicative circuit.

In the invention according to the eighth variant, so long as there is a communicative circuit, a flag and a supervisor are not required.

The invention according to a ninth variant is a file system of the seventh variant, wherein said sequencing means transfers a flag of each drive as a copy to all other drives, and said examination is performed by referring to the copy of a flag in other drives.

In the invention according to the ninth variant, since the sequencing means of each drive does not need to refer to the condition of other drives or the flag which was established in other drives on each occasion of an examination by a communicative circuit, management at the time of renewal is performed speedily.

The invention according to a tenth variant is a file system of the second variant, wherein said sequencing means further sequences the limiting of renewal for each drive within each fixed time cycle based on a fixed clock.

In the invention according to the tenth variant, since an opportunity of renewal for each drive is provided with certainty in a fixed cycle, renewal in a specific drive is not delayed by continuation of renewal in other drives.

The invention according to an eleventh variant is a file system of the second variant further comprising: plural drives, wherein each file is recorded on the plural drives.

The invention according to the eleventh variant, is a so-called distributed file system and usually differs in file, which exists in each drive. For this reason, the timing when a buffer of each drive is filled up and a waiting time for renewal of driving decreases. That is to say, in case that the content of all drives is the same, like in the mirroring technique, timing of an entry to plural drives is made coincident and useless time can be decreased.

The invention according to a twelfth variant is a file system of the first and second embodiments, wherein each drive is respectively a separate independent disk drive and each medium is a recording disk of each disk drive.

In the invention according to the twelfth variant, in comparison with the partition of a single disk into logical plural drives, the possibility in which plural files are lost by break down of a single drive can be reduced.

The invention according to a thirteenth variant is a file system of the first and second embodiments (discussed below), wherein each drive is partitioned.

In the invention according to the thirteenth variant, because plural drives are not required, a file system which excels in reliability is realized by the simple hardware construction and low-price.

The invention according to the second embodiment is a file system comprising: a nonvolatile storage device having a recording medium; plural blocks which are constructed on said medium as units of access; a volatile memory device comprising a buffer; a buffering means for temporarily storing buffer blocks to be written on each of said blocks corresponding to each single operation; examining means for deciding the necessity of renewal of said medium by said buffer blocks; a renewing means for continuously renewing said blocks of the drive by said buffer blocks corresponding to a single operation when said renewal was regarded as necessary.

In the invention according to the second embodiment, at the time of renewal of a medium, renewal by one or a plurality of block data to be operated by single operation to a drive is continuously performed. As a result, a condition of "writing unfinished" is limited to only the renewal.

The invention according to a fourteenth variant is a file system of the second embodiment, wherein said buffer means records an operation along with each corresponding block data by using discriminating information, wherein said renewing means performs said renewal at all block data corresponding to a single operation as a unit based on said discriminating information.

In the invention according to the fourteenth variant, each operation and block data correspondence relation can be specified easily by recording discriminating information like a code number. As a result, a special data structure is not used and renewal in the unit of operation can be realized by simple construction.

The invention according to a fifteenth variant is a file system of the fourteenth variant, wherein, in case that the block data is identical for a plurality of operations, said renewing means continuously renews the block data which corresponds to these plurals operations.

In the invention according to the fifteenth variant, in case that renewal of an identical block is performed by plural operation, the block is not renewed by only contents of partial operation. For this reason, consistency between blocks as an object of other operations is not lost.

BRIEF DESCRIPTION OF THE DRAWINGS

In order to more fully understand the drawings used in the detailed description of the present invention, a brief description of each drawing is provided.

FIG. 5 is a table showing an operation number of an operation demand for drive 1S of FIG. 1 and a renewal object block address;

FIG. 6 is a table which shows an initial condition of a buffer for the block data 1D of FIG. 1;

FIG. 7 is a table which shows the condition after the time when operation 1 of the buffer for the block data 1D of FIG. 1 is completed;

FIG. 8 is a table which shows the condition after the time when operation 2 of the buffer for the block data 1D of FIG. 1 is completed;

FIG. 9 is a table which shows the condition after the time when operation 3 of the buffer for the block data 1D of FIG. 1 is completed;

FIG. 11 is a career table of operation in embodiment 2; and

FIG. 12 shows contents of the buffer for the block data in embodiment 2.

Figure 1:
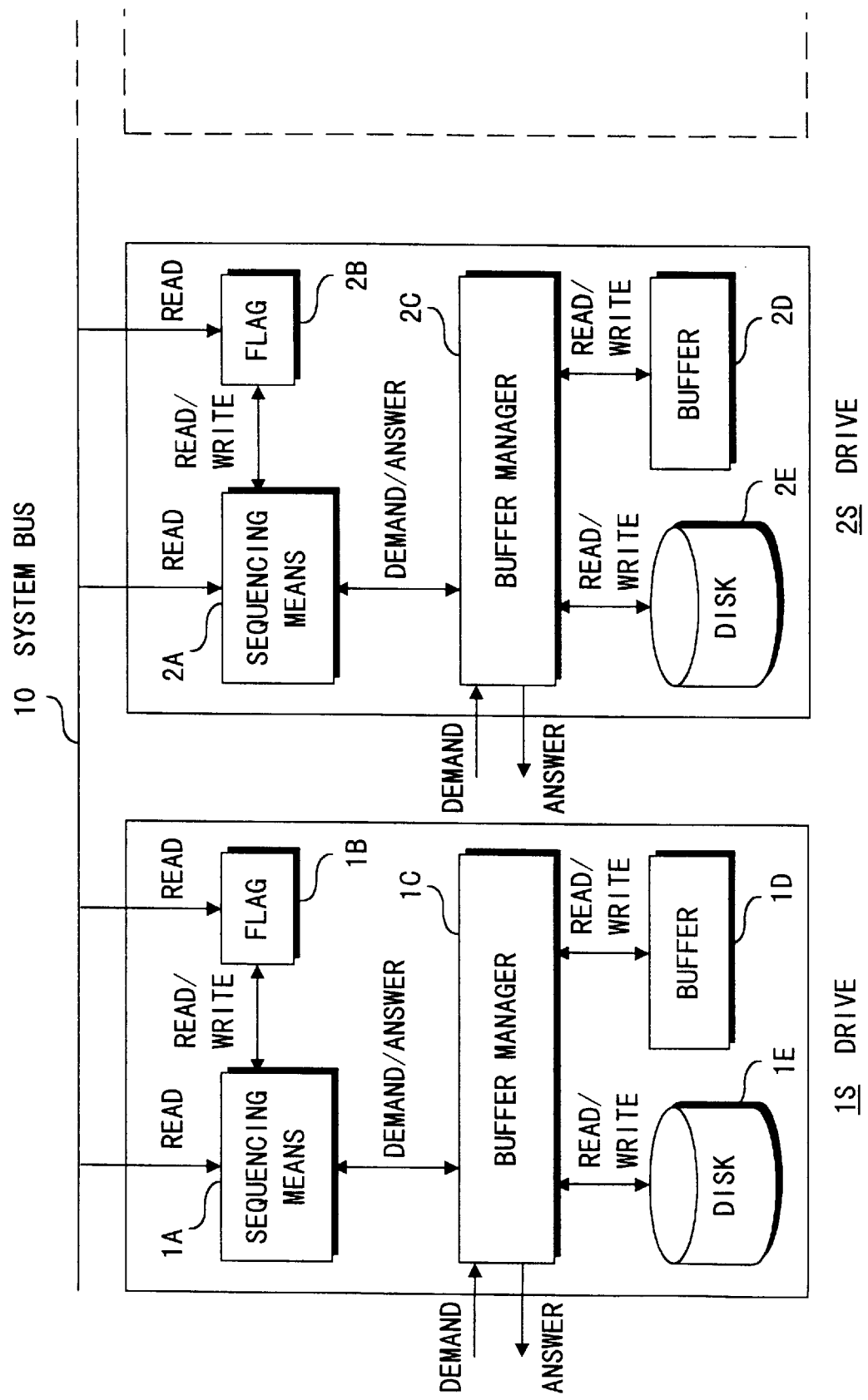
FIG. 1 is a structural chart which shows a structural element of the embodiment 1 of a file system, of this invention.

In the drawings, 1S,2S indicate drives, 1A,2A indicate a sequencing means, 1B,2B indicate flags, 1C,2C indicate buffer managers, 1D,2D indicate buffers for the block data, 1E,2E indicate disks, and 10 indicates a systematic bus.

DETAILED DESCRIPTION

Referring to the drawings, there is shown the preferred embodiments of the present invention. The embodiments shown below are implemented on a computer, and each function of the embodiments is implemented by executing a specified procedure (program) on the computer.

Each "means" described in this specification is a conceptual means corresponding to each function of an embodiment, and there is not always a one-to-one physical correspondence between means and hardware units or software routines. For example, a hardware unit, which may act as a means when a first statement is executed, may also act as a second means when another statement is executed. Similarly, a means, which is implemented by a single statement in some cases, may be implemented by a plurality of statements in some other cases.

Therefore, each embodiment in this specification will be described by way of a virtual circuit block (means) having each function of the embodiment. However, the implementation of the present invention on a computer is only one example. All or part of the functions of the present invention may be implemented on an electronic circuit such as a custom chip (custom integrated circuit) if possible.

The computer used in each embodiment is composed of the CPU and main memory (main storage) consisting of RAM (Random Access Memory). The computer may be a computer of any size: microcomputer, personal computer, small computer, workstation, or mainframe.

The hardware of the computer typically includes input devices such as a keyboard and a mouse, external storage such as a hard disk, output devices such as a CRT display device, a printer and necessary input/output control circuits.

The hardware configuration of the computer may be changed as long as the present invention is implemented; that is, some components may be added, replaced or removed. For example, the embodiment may be implemented on a computer network with a plurality of computers. Any type of computer may be used concurrently, or one CPU may be time-shared for executing a plurality of processes concurrently. Other input devices (for example, pointing, devices such as a touch panel, light pen, and track ball, image input devices such as a digitizer or image reader, voice recognition devices, and various types of, sensors) may be used. Other external storages (for example floppy disk drive, RAM card device, magnetic tape device, optical disk device, optical magnetic disk device, bubble memory, or flash memory) may be used. Other output devices (for example, liquid crystal device, plasma display device, video projector, LED display device, voice generation circuit, or voice synthesizer) may be used.

In order to implement the embodiment on the computer described above, an application program which implements each function of the embodiment is normally executed under the auspices of the operating system (OS). In addition, a program which implements the embodiment is in the form of machine language produced typically by compiling (translating) the program with the use of a high-level language or an assembler. However, the software configuration of the above described computer may also be changed as long as the present invention may be implemented; for example, an OS is not necessarily used, any form of program may be used, and an interpreter (serial interpretation-execution) such as BASIC may be used.

The program may be stored in any form; that is, it may be stored in ROM (read only memory), or it may be stored in an external storage such as a hard disk for later loading (reading) into memory when the computer is started or processing is started. In addition, the program may be divided into a plurality of modules, each of which is loaded into main memory as necessary. In this case, all the modules of the program need not be in the same form or on the same device.

The execution sequence of the procedure steps of the embodiment may be changed, or the steps may be executed in parallel, as long as the object of the present invention is attained. Each step may be executed in any sequence each time it is executed. The user may change the sequence, for example, by using the menu-driven interface through which he can select one of the executable processing options.

The term "input" used in this specification refers not only to the input of data but also to other processing closely associated with data input. This type of processing includes such processing as input data echo-back or data modification and editing. The term "output" used in this specification refers not only to the output of data but also to other processing closely associated with data output. This type of processing includes such processing as the input of output ranges or the instruction of scrolling. In addition, input and output may be integrated through the interactive input/output operation, and selection, specification, and identification may be done through this integrated input output operation.

All the events outside the computer are processed within the computer as data, for example, as event parameters. Data (information) described in this specification may be in any form or on any type of storage. For example, data may be stored on any hardware component (for example, main storage, external storage, CPU registers, or cache memory). In addition, data may be stored in any form. For example, data may be stored in a file, or it may be accessed directly using a physical memory for storage address. Data may be represented in any form, for example, a character string may be represented in characters or words. Data may be stored for the period of time the user wants, and may be erased after the period of time has elapsed. Data that should be stored unaltered for a long time, such as dictionary data, may be stored in ROM.

Any reference to a particular item in this specification assumes that any associated information is also implied. For example, when a disk file is mentioned, it should be understood that the File Allocation Table (FAT) or directories are also mentioned and that their descriptions are omitted. In this specification, general information necessary for the operation of the present invention, such as pointers, counters, flags, parameters, and buffers, is also used as necessary.

Unless otherwise specified, information necessary for the processing of a component in the embodiment is obtained from other components containing the information. This information is obtained, for example, by accessing a variable or memory location containing that information. Note that the erasure or cancellation of information does not necessarily require the deletion of data itself from the storage area; instead, it may be done, for example, by setting the erase flag.

1. Construction of the first embodiment

FIG. 1 is a functional block diagram showing the structure of embodiment 1, wherein a distributed file system includes a plurality of drives 1S, 2S, - - - nS (n is an integer greater than or equal to two), and a system bus 10 which connects these drives 1S, 2S, - - - nS.

Drive 1S has sequencing means 1A, flag 1B, a buffer manager 1C (which corresponds to the buffer means in the claims), buffer 1D and disk 1E. Disk 1E corresponds to the recording medium in the claims. Buffer manager 1C and buffer 2D correspond to the buffer means in the claims. Buffer manager 1C also corresponds to the examining means and the renewing means in the claims. In embodiment 1, herein-after, the term "flush" refers to the renewal process which renews blocks of the drive by all buffer blocks in the buffer.

Sequencing means 1A, when demand of a flush start is received from buffer manager 1C, sets the flag 1B and then examines flags of other drives. Sequencing means 1A, when the flag of "examining" and "renewing" of other drives were not found, sets flag 1B to "renewing" and then returns the permission for flush start to buffer manager 1C, which sent the demand. Flag 1B indicates the state of drive 1S, as described above, in case the sequencing means 1A is examining and buffer manager 1C is executing the flush process, respectively, flag 1B is set to "examining" and "renewing", and, in the other case, flag 1B is set to "normal" by sequencing means 1A.

In other words, buffer manager 1C, upon receiving some operation demand to drive 1S from the outside, sends the command for flush start to sequencing means 1A. Also, buffer manager 1C, as described above, upon receiving permission for flush start from sequencing means 1A, renews disk 1E by all data blocks in buffer 1D to be used for renewal.

Drive 2S has flush sequencing means 2A, flag 2B, buffer manager 2C, buffer 2D and disk 2E. The elements 2S–2E have the same constructions as elements 1A–1E of drive 1S. In the same manner, each drive nS has sequencing means nA, flag nB, buffer manager nC, buffet nD and disk nE. These elements nA–nE are also constructed identically to elements 1A–1E of drive 1S.

Figure 2:
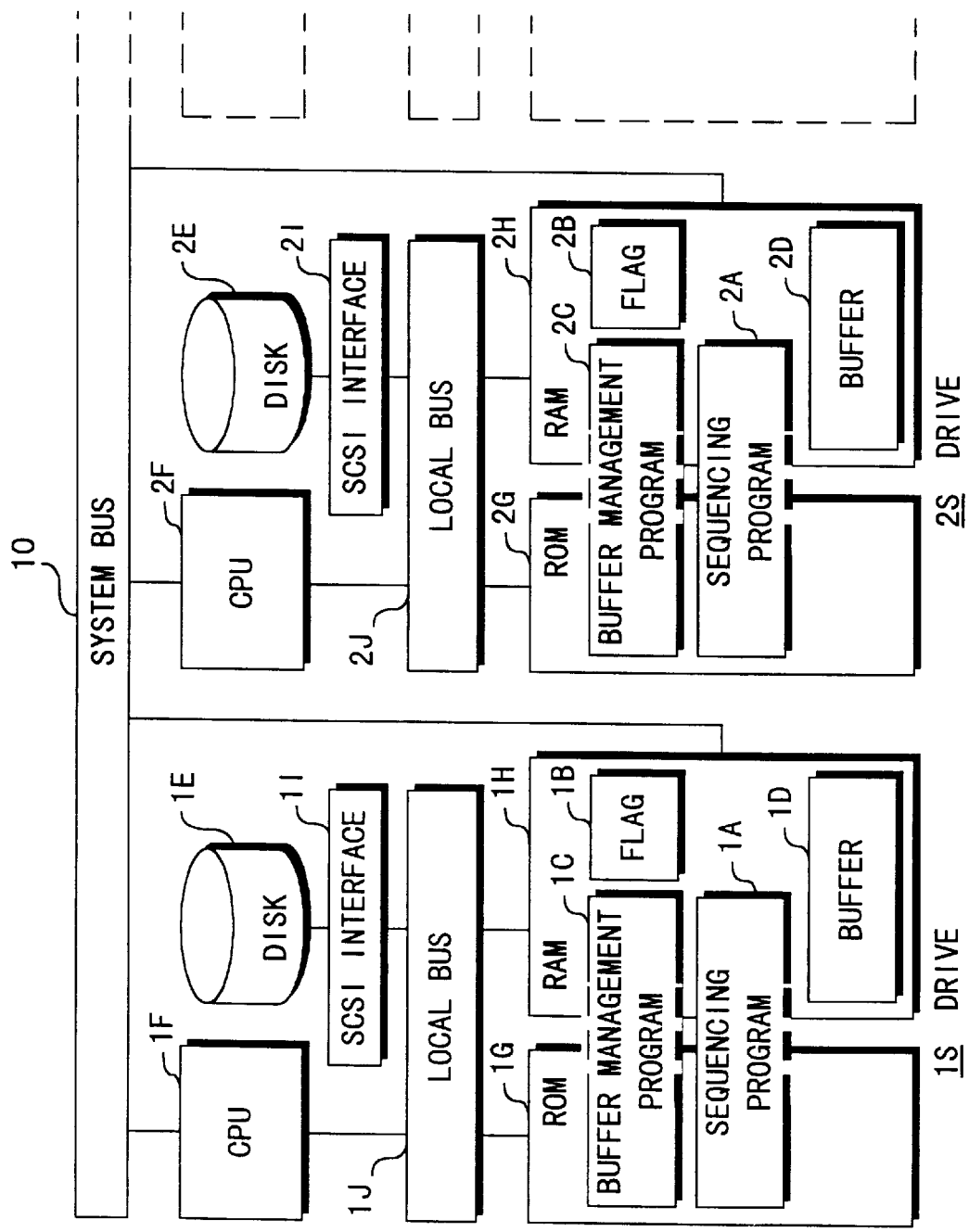
FIG. 2 is a conceptual chart which shows one example of systematic concrete construction of FIG. 1.

FIG. 2 is a conceptual chart which shows one example of hardware construction of the system shown in FIG. 1. Drive IS has CPU (1F), ROM (1G), RAM (1H), SCSI standard disk interface (1I), disk 1E and local bus 1J. Buffer manager 1C, sequencing means 1A, flag 1B and buffer 1D are formed in ROM 1G and RAM 1H. Similarly, drive 2S has CPU (2F), ROM (2G), RAM (2H), SCSI standard disk interface (2I), disk 2E and local bus 2J. Buffer manager 2C, sequencing means 2A, flag 2B and buffer 2D are formed in ROM 2G and RAM (2H).

Embodiment 1 is the so called Distributed File System (DFS) which has a plurality of drives and which records each file on the plurality of drives (the eleventh variation). In the DFS, each drive usually has different contents, i.e., different files sizes and different operations which are performed, so the timing when the buffer of each drive is filled up differs between drives. Accordingly, this embodiment 1 decreases a waiting time for renewal. In contrast, in the mirroring technique, every drive records the identical contents, renewal of every drive is executed almost simultaneously and a useless waiting time occurs.

Moreover, each drive is respectively a separate independent disk unit according to the first embodiment, each medium being a recording disk (the twelfth variant). For this reason, by the embodiment 1, the possibility of plural files being lost by failure of a single drive can be avoided.

On the contrary, each drive may be substituted with each partition which was established within a single disk unit (thirteenth variant). If it is done in this way, the plurality of drives are unnecessary. Because the plurality of partitions work the same as the plurality of drives, the hardware constrution of such a single partitioned drive is simple and inexpensive.

2. Action and effect of embodiment 1

Action of the distributed file system (DFS) of this embodiment is explained below with reference to FIGS. 3 and 4.

Figure 3:
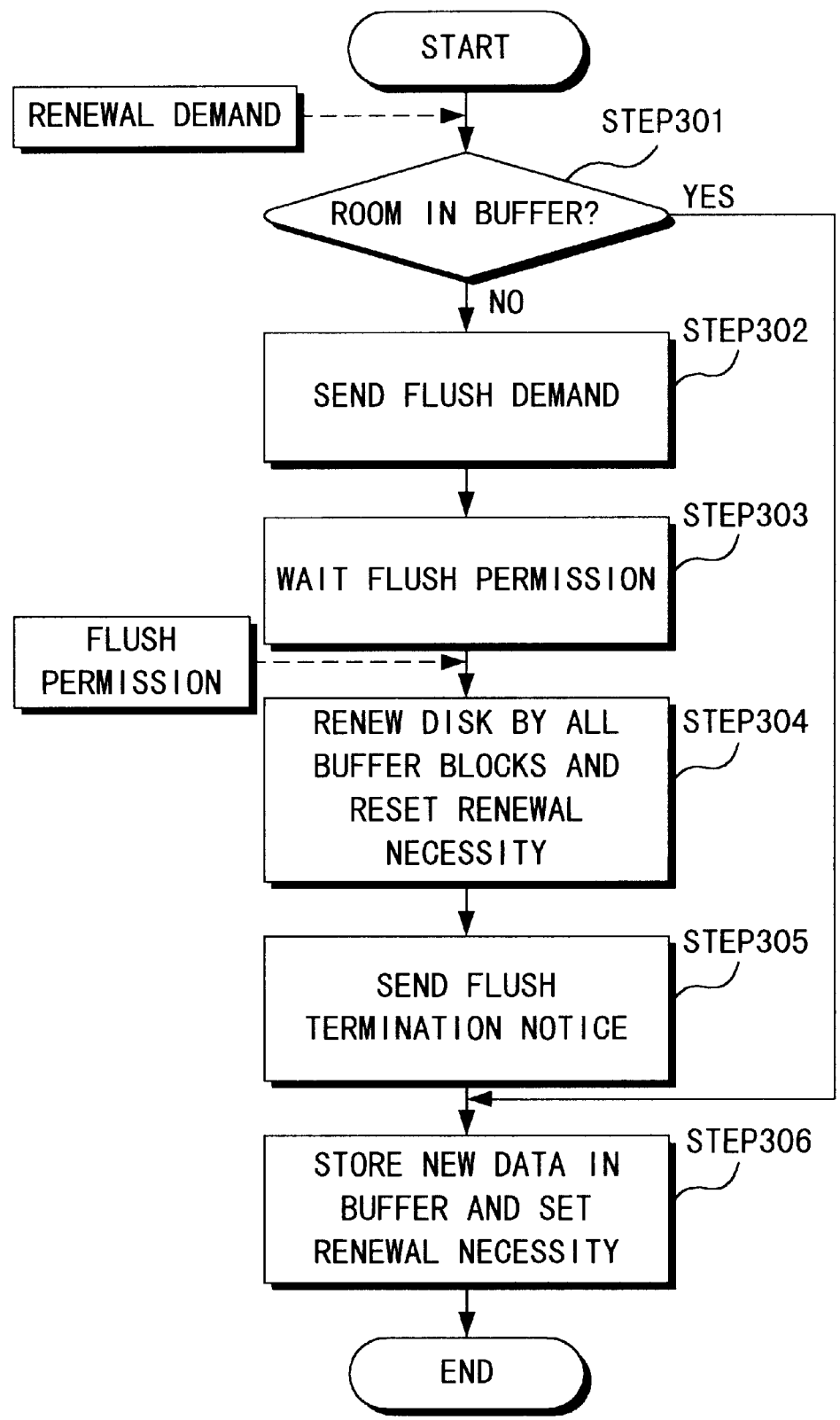
FIG. 3 is a flow chart which shows a transactional process, wherein a buffer manager of FIG. 1 receives an entry demand (renewal demand) of a block.

FIG. 3 is a flow chart which shows the transactional process in the event that the buffer manager received an entry command (renewal demand) of a block. FIG. 4 is a flow chart which shows the transactional process in the event that the sequencing means received a flush demand.

For ease of example, the management of data (in the event that renewal of a block as shown in FIG. 5 is required) is explained with reference to the single drive 1S (which is shown in FIG. 1).

For convenience, initially assume that all disks 1E–nE of all drives 1S–nS have consistent data and all flags 1B–nB of drive 1S–nS are set to "usual". Further assume, as shown in FIG. 6, that the entire area in buffer 1D of drive 1S is vacant.

2-1. In case that all other drives indicate an "usual" status

First of all, buffer manager 1C, upon receiving a demand of a first operation which needs renewal of blocks 1,2,3, (FIG. 5), judges whether the three areas (number of entry blocks) are vacant or not necessary to renew (step 301/first variant). In this case (as shown in FIG. 6), in order that there is a vacant area of 3 blocks within buffer 1D, on each of a vacant area of these 3 blocks, it stores a block address and data contents of entry blocks 1,2,3 and renewal necessity is turned into "possession" (Step 306). As a result, contents of buffer block data 1D is shown in FIG. 7. During this process, since renewal of disk 1E is not performed, consistency of data within disk 1E is still maintained. In addition, data contents of each block in the buffer corresponds to the buffer blocks in the claims.

Second, buffer manager 1C, upon receiving a demand of a second operation which needs renewal of blocks 4,5,6 (FIG. 5), judges whether 3 (number of entry blocks) blocks of vacant area, or area without necessity of renewal, exists in buffer 1D (FIG. 3/Step 301). In this case (as shown in FIG. 7), since there is a vacant area of 3 blocks within buffer 1D, on each of a vacant area of these 3 blocks, it stores a block address and data contents of entry block 4,5,6 and renewal necessity is turned into "possession" (Step 306). As a result, contents of the buffer for the block data 1D come to be shown in FIG. 8. During this process, since renewal of disk 1E is not performed, consistency of data within disk 1E is still maintained.

Furthermore, buffer manager 1C, upon receiving a demand of a third operation which needs renewal of blocks 7,8,9 (FIG. 5), judges whether the vacant area or area without necessity of renewal of 3 blocks (number of entry blocks) within buffer 1D (FIG. 3/Step 301) exists. In this case (as shown in FIG. 8), since there is no vacant area of 3 blocks or area without necessity of renewal within buffer 1D, buffer manager 1C sends a flush demand to sequencing means 1A (Step 302) and waits for flush permission from sequencing means 1A (step 303).

Figure 4:
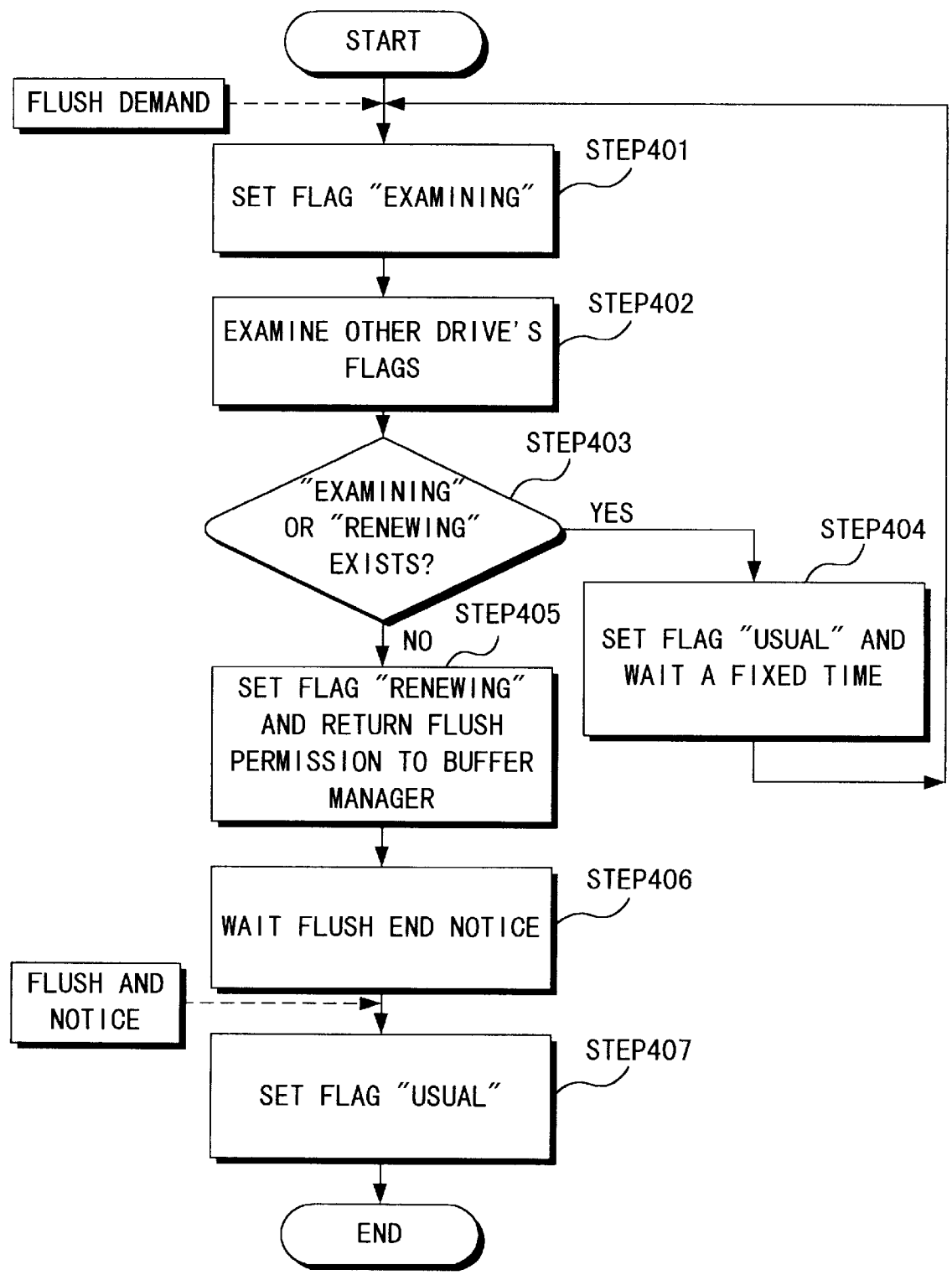
FIG. 4 is a flow chart which shows a transactional process, wherein a sequencing means of FIG. 1 receives a flush demand.
Figure 10:
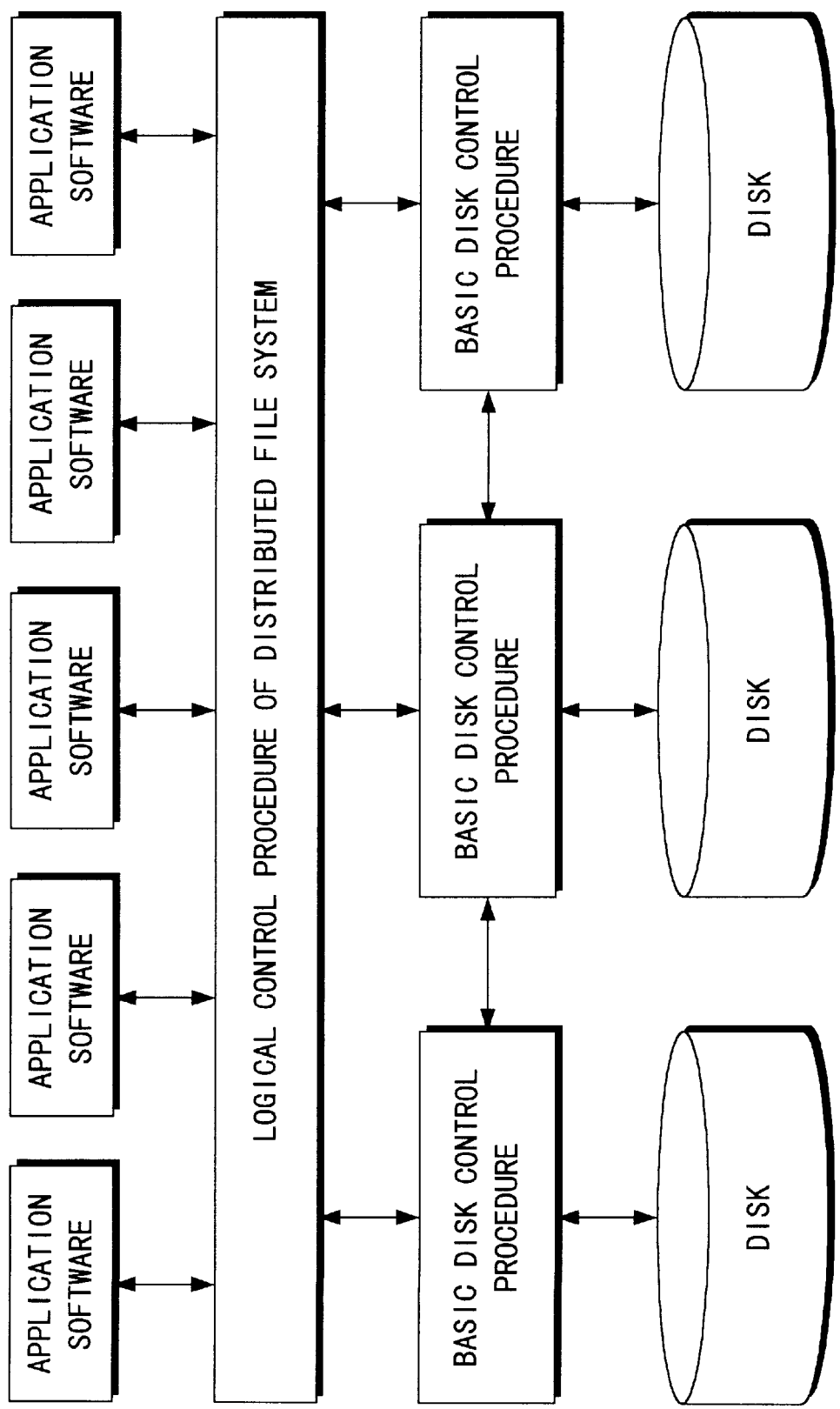
FIG. 10 is a conceptual chart which shows a software construction of a distributed file system.

Sequencing means 1A, upon receiving a flush demand from buffer manager 1C, as shown in FIG. 4, sets the flag to "examining" (step 401 sixth variant). Sequencing means 1A checks flag 2B–nB of other drives 2S–nS, (step 402), then judges whether drives of "renewing" or "examining" exist (step 403). Then, if there are not also other drives 2S–nS in an "examining" or a "renewing" state, sequencing means 1A sets flag 1B to "renewing", returns a flush permission to buffer manager 1C which sent the demand (step 405), and waits for a flush completion notice from buffer manager 1C (step 406).

Now, since disk 1E of drive 1S is not renewed and keeping the initial condition, consistency of data on this disk 1E has been maintained still.

Buffer manager 1C, upon receiving a flush permission from sequencing means 1A, performs flushing by renewing the disk with the data of an entire area, marked for renewal necessity by buffer 1D (step 304). In other words, disk 1E is renewed by block addresses and contents of blocks 1,2,3,4, 5,6 which had been stored in an area marked as necessity of renewal. The necessity state of renewal of the area of these 6 blocks is then changed to a "no" condition.

At a halfway point of this flush management, since disk 1E is renewed by a part of block 1,2,3 or block 4,5,6, and all plural blocks to be renewed with a single operation are not yet renewed, consistency of data on disk 1E is not taken at this point of time.

But, when object block 1,2,3,4,5,6 of disk 1E finished being renewed by the entire data of these 6 blocks, consistency of data on disk 1E is recovered again. After this flush process, buffer manager 1C sends a flush completion notice to sequencing means 1A (step 305). Sequencing means 1A, upon receiving a flush completion notice from buffer manager 1C, sets flag 1B to "usual" (FIG. 4/step 407).

Buffer manager 1C continuously stores block addresses and data contents of blocks 7,8,9 to a vacant area or an area without necessity of renewal in buffer 1D and sets renewal necessity to a "to be" condition (step 306). As a result, contents of the buffer for the block data 1D are shown in FIG. 9. But in this case, since disk 1E is not renewed, consistency of data on disk 1E is still maintained.

In this way, concerning drive 1S of this embodiment, it is only when a flush of buffer 1D is being executed and flag 1B is set to "renewing" that consistency of blocks on disk 1E is broken.

2-2. In case that any other drive is "examining" or "renewing"

On the other hand, for example, while drive 2S is executing a flush process, flag 2B of drive 2S indicates a "renewing" status. Under this condition, if sequencing means 1A in drive 1S received another flush demand, it sets flag 1B to an "examining" status (step 401) as shown in FIG. 4, and starts examining other flags 2B, . . . nB which indicate status of other drives, 2S . . . nS, respectively (step 402), and senses that there is a drive in an "examining" or "renewing" status (step 403).

Sequencing means 1A then switches flag 1B to "usual" and waits for a fixed period of time (step 404/fourth and fifth variants). After this waiting period, sequencing means 1A again switches flag 1B back to the "examining" status, as shown in FIG. 4 (step 401), and checks the flags 2B, . . . nB, for their drive status, to sense whether or not there are any more drives in the "examining" or "renewing" status (step 403). If drive 2S is still "renewing" here, sequencing means 1A sets flag 1B to "usual" and waits again for another fixed time period.

On the contrary, if the flush process performed in drive 2A is completed while sequencing means 1A is waiting, and, consequently, flag 2B for status of drive 2A returns to "usual", sequencing means 1A judges that there is no drive in "examining" or "renewing" status. In this case, sequencing means 1A switches flag 1B to "renewing" and returns permission for the flush start to buffer manager 1C (step 405), and waits until flush completion notice is received from buffer manager 1C (step 406). Finally, on receiving the notice from buffer manager 1C, sequencing means 1A switches flag 1B back to "usual" (step 407).

In this manner of the first embodiment, sequencing means 1A controls execution of the flush process by buffer manager 1C, by putting it off when there is any drive in an "examining" or "renewing" status. When no drive is sensed "examining" or "renewing", sequencing means 1A then allows buffer manager 1C to execute a flush process by returning the permission for flush start to buffer manager 1C. That is, a flush process is performed in only one particular drive at one time.

As stated so far, in the first embodiment, disk 1E fails to keep its data consistency only when a flush process performed in buffer 1D is being executed, that is, when flag 1B is indicating "renewing". Since no flush process is performed in more than one drive at one time, there is no possibility of losing data consistency in more than one drive. Therefore, even if some or all drives were abnormally terminated due to an accident, multiple file data stored in all of these drives should be securely kept in at least one of them.

Especially in this embodiment, time overlap for file renewal can be avoided since the sequencing means detects a different renewing drive every time new renewal takes place, thus sequencing process can be securely performed. Moreover, by providing the sequencing means with control for renewal, a file system with a higher reliability can be obtained. In addition, this invention can use existing hardware or procedures for renewal purpose and therefore, contributes effectively to reuse of system resources. In other words, when this invention is applied to an existing file system, it is not necessary to change logical control procedures in the system, only if basic control procedures to access disks, such as hardware or BIOS (Basic Input/Output System), is adequately altered.

2. Second Embodiment

The second embodiment is a distributed file system which corresponds to the fourteenth and the fifteenth variants. Construction of the second embodiment is similar to the first embodiment for the most part. In this embodiment, however, the foregoing buffering means is composed in order that each operation and its corresponding buffer block are recorded by using identification data. And the foregoing renewing means is composed in order that renewal is processed for all buffer blocks which correspond to a single operation, based on the identification data. Moreover, when one buffer block is included as an object of a plural number of operations, the said renewing means is composed in order that all buffer blocks relating to all these operations are renewed sequentially.

For example, every time contents of an operation are recorded in the buffer, operation number and object buffer block number are recorded in a reference table (FIG. 11). Also, each operation number which specifies each object buffer block is stored in a fixed area of the buffer (FIG. 12). In FIGS. 11 and 12, for example, the first operation is performed on blocks 3 and 5, the second operation is performed on blocks 3 and 4, and the third operation is performed on blocks 3 and 5. In this case, in addition to group renewal of blocks 1 and 2, group renewal of blocks 3,4,5 which are related to operations 2 and 3, respectively, are also performed. This is because renewing blocks 3 and 4 without renewing block 5 is, so to speak, a status of "writing unfinished" at the stage of operation 3.

By simply recording identification data in form of a code number, the second embodiment makes it possible to easily specify a relationship between each operation and the buffer blocks relating to it. Therefore, renewing is easily performed with a simple process according to each operation, without using any special data structure.

Moreover, in this embodiment, there is never a case when a buffer block is renewed based on only part of operations when it is specified as an object of a plural number of operations. Therefore, consistency is kept between the blocks which are specified as objects of other operations.

3. Other Embodiments

This invention is not restricted to the above-mentioned embodiments and it also allows various kinds of diversity in various ways. For example, some alterations may be suitable in specifying a practical structure and procedures in the buffering means and the sequencing means. Also, it is possible change structures of components other than these means of the system, or, whole structure of drives if necessary. For another example, a buffer flush may be executed, not only in case that there is not enough room available for writing new data, but also when a command for a buffer flush is given from a user or a program, when a command for medium retrieval from disk is given, or when system termination is required etc. Moreover, the sequencing means may be composed in order that the examinations performed by gathering information on status of other drives via data communication lines (eighth variant). In such an embodiment, flags or supervisors are not necessary for the examination as it is performed within the data communication lines as their built-in function.

It is also possible to compose the sequencing means in order that the examinations performed by referring each copied flag which is transferred from its original drive to others (ninth variant). In such an embodiment, renewal at higher speed can be obtained in the sequencing means of each drive, since there is no more need to refer flags for the other drives and their status using data communication lines. Popularly known LAN systems such as ETHERNET or MAP are available for the above-mentioned data communication and flag transfer.

Also, the sequencing means may be composed in order that the sequencing process is performed by restricting renewing of each drive within the corresponding clock cycle based on a fixed clock (tenth variant). In such embodiment, renewal possibility in each drive is secured based an a fixed cycle. This avoids delay of renewal in a specific drive which is caused by sequential renewing in the others.

What is claimed is:

1. A file system comprising:
   a plurality of drives, each forming a nonvolatile storage device having a recording medium;
   a plurality of blocks which are constructed on each recording medium as unites of access;
   a plurality of buffers, each forming a volatile memory device and each corresponding to one of said drives;
   buffering means for temporarily storing buffer blocks which are data to be written in each of said blocks on said medium;
   examining means for deciding the necessity of renewal of each recording medium by corresponding buffer blocks; and
   a renewing means for updating said block on said medium of one of said drives with buffer blocks contained in the buffer corresponding to said one of said drives when renewal is regarded as necessary;
      wherein said examining means investigates whether room exists for new data in the buffer when new data based on a single operation are written in the buffer, and decides that said renewal if required when room does not exist in the buffer.

2. A file system comprising:
   a plurality of drives, each forming a nonvolatile storage device having a recording medium;
   a plurality of blocks which are constructed on said medium as units of access;
   a buffer forming a volatile memory device;
   buffering means for temporarily storing all buffer blocks corresponding to a single operation, which are data to be written in each of said blocks on said medium;
   examining means for deciding the necessity of renewal of said medium by said buffer blocks;
   renewing means for updating said blocks of each of said drives by buffer blocks corresponding to at least a single operation, when renewal is regarded as necessary; and
   a sequencing means for executing renewal for each said drive of said plurality of drives sequentially and preventing said renewal from occurring simultaneously in two drives.

3. A file system as claimed in claim 2,
   wherein said sequencing means determines whether any other of said drives are in a renewal state when said renewal is being performed on one of said drives, and deters renewal for said drive, and executes renewal for said drive of said drives when no other renewal state exists.

4. A file system comprising:
   a plurality of drives, each forming a nonvolatile storage device having a recording medium, said recording medium being accessed by a unit data;
   a plurality of buffers, each forming a volatile memory device and each corresponding to one of said drives, each buffer being capable to store a plurality of unit data;
   buffering means for temporarily storing a plurality of writing data, each being subject to be written into said medium, said writing data corresponding to a single operation and each including a plurality of buffer blocks, each buffer block having the same size with said unit data;

examining means for deciding the necessity of renewal of each recording medium bu corresponding buffer blocks;

a renewing means for updating said block on said medium of one of said drives with buffer blocks contained in the buffer corresponding to said one of said drives, when renewal is regarded as necessary; and a sequencing means for executing renewal for each said drive of said plurality of drives sequentially and preventing said renewal from occurring simultaneously in two drives;

wherein said sequencing means determines whether any other of said drives are in a renewal state when said renewal is being performed on one of said drives, and deters renewal for said drive, and executes renewal for said drive of said drives when no other renewal state exists, when a renewing drive exists, waits for a fixed time period, investigates again whether the renewing drive is still renewing and makes renewing means start renewal on another drive when the renewing drive completes a renewing process.

5. A file system comprising:

a plurality of drives, each forming a nonvolatile storage device having a recording medium;

a plurality of blocks which are constructed on each recording medium as units of access;

a plurality of buffers, each forming a volatile memory device and each corresponding to one of said drives;

buffering means for temporarily storing a plurality of writing data, each being subject to be written into said medium; said writing date corresponding to a single operation and each including a plurality of buffer blocks, each buffer block having the same size with said unit data;

examining means for deciding the necessity of renewal of each recording medium bu corresponding buffer blocks;

a renewing means for updating said block on said medium of one of said drives with buffer blocks contained in the buffer corresponding to said one of said drives, when renewal is regarded as necessary; and a sequencing means for executing renewal for each said drive of said plurality of drives sequentially and preventing said renewal from occurring simultaneously in two drives;

wherein said sequencing means is established individually on each of the drives.

6. A file system as claimed in claim 4, wherein said sequencing means awaits for a fixed time if a drive under the examination was detected and it is possible to set the waiting time for renewal and waiting time for examination separately.

7. A file system as claimed in claim 6, wherein said sequencing means sets the flag showing a status of each drive to "examining", "renewing" and other conditions corresponding to a condition of a drive and, when renewal is performed, investigates flags of other said drives.

8. A file system as claimed in claim 5, wherein each said sequencing means performs said examination by collecting information concerning a condition of other drives by way of a communicative circuit.

9. A file system as claimed in claim 5, wherein said sequencing means transfers a flag of each drive as a copy to all other drives, and said examination is performed by referring to the copy of a flag in the other drives.

10. A file system comprising:

a plurality of drives, each forming a nonvolatile storage device having a recording medium; said recording medium begin accessed by a unit data;

a plurality of buffers, each forming a volatile memory device and each corresponding to one of said drives; each buffer being capable to store a plurality of unit data;

buffering means for temporarily storing a plurality of writing data, each being subject to be written into said medium, said writing data corresponding to a single operation and each including a plurality of buffer blocks, each buffer block having the same size with said unit data;

examining means for deciding the necessity of renewal of each recording medium bu corresponding buffer blocks;

a renewing means for updating said block on said medium of one of said drives with buffer blocks contained in the buffer corresponding to said one of said drives, when renewal is regarded as necessary; and a sequencing means for executing renewal for each said drive of said plurality of drives sequentially and preventing said renewal from occurring simultaneously in two drives;

wherein said sequencing means sequences renewal of each drive within each fixed time cycle based on a fixed clock.

11. A file system comprising:

a plurality of drives, each forming a nonvolatile storage device having a recording medium, said recording medium being access by a unit data;

a plurality of buffer, each forming a volatile memory device and each corresponding to one of said drives, each buffer being capable to store a plurality of unit data;

buffering means for temporarily storing a plurality of writing data, each being subject to be written into said medium, said writing data corresponding to a single operation and each including a plurality of buffer blocks, each buffer block having the same size with said unit data;

examining means for deciding the necessity of renewal of said medium by said buffer blocks;

renewing means for updating said blocks of each of said drives by buffer blocks corresponding to at least a single operation, when renewal is regarded as necessary; and a sequencing means for executing renewal for each said drive of said plurality of drives sequentially and preventing said renewal from occurring simultaneously in two drives; and wherein said sequencing means determines whether any other of said drives are in a renewal state when said renewal is being performed on one of said drives, and deters renewal of said drive, and executes renewal for said drive of said drives when no other renewal state exists, and wherein said sequencing means, when a renewing drive exists, waits for a fixed time period, investigates again whether the renewing drive is still renewing and makes renewing means starts renewal on another drive when the renewing drive completes a renewing process.

12. A file system as claimed in claim 11,
wherein said sequencing means awaits for a fixed time if a drive under the examination was detected and it is possible to set the waiting time for renewal and waiting time for examination separately.

13. A file system comprising:
a plurality of drives, each forming a nonvolatile storage device having a recording medium, said recording medium being accessed by a unit data;
a buffer forming a volatile memory device and each corresponding to one of said drives, each buffer being capable to store a plurality of unit data;
buffering means for temporarily storing a plurality of writing data, each being subject to be written into said medium, said writing data corresponding to a single operation and each including a plurality of buffer blocks, each buffer block having the same size with said unit data;
examining means for deciding the necessity of renewal of said medium by said buffer blocks;
renewing means for updating said blocks of each of said drives by buffer blocks corresponding to at least a single operations, when renewal is regarded as necessary; and
a sequencing means for executing renewal for each said drive of said plurality of drives sequentially and preventing said renewal from occurring simultaneously in two drives; and
wherein said sequencing means determines whether any other of said drives are in a renewal state when said renewal is being performed on one of said drives, and deters renewal of said drive, and executes renewal for said drive of said drives when no other renewal state exists, and
wherein said sequencing means sets the flat showing a status of each drive to "examining", "renewing" and other conditions corresponding to a condition of a drive and, when renewal is performed, investigates flags of other said drives.

14. A file system comprising:
a plurality of drives, each forming a nonvolatile storage device having a recording medium, said recording medium being accessed by a unit data;
a plurality of buffers, each forming a volatile memory device and each corresponding to one of said drives, each buffer being capable to store a plurality of unit data;
buffering means for temporarily storing a plurality of writing data, each being subject to be written into said medium, said writing data corresponding to a single operation and each including a plurality of buffer blocks, each buffer block having the same size with said unit data;
examining means for deciding the necessity of renewal of said medium by said buffer blocks;
renewing means for updating said blocks of each of said drives by buffer blocks corresponding to at least a single operation, when renewal is regarded as necessary; and
a sequencing means for executing renewal from occurring simultaneously in to drives;
wherein said sequencing means is established individually on each of the drives.
wherein said sequencing means is established individually on each of the drives.

15. A file system as claimed in claim 14,
wherein said sequencing means transfers a flag of each drive as a copy to all other drives, and said examination is performed by referring to the copy of a flag in the other drives.

16. A file system as claimed in claim 15,
wherein each said sequencing means performs said examination by collecting information concerning a condition of other said drives by way of a communicative circuit.

17. A file system comprising:
a plurality of drives, each forming a nonvolatile storage device having a recording medium, said recording medium being accessed by a unit data;
a plurality of buffers, each forming a volatile memory device and each corresponding to one of said drives, each buffer being capable to store a plurality of writing data;
buffering means for temporarily storing a plurality of writing data, each being subject to be written into said medium, said writing data corresponding to a single operation and each including a plurality of buffer blocks, each buffer block having the same size with said unit data;
examining means for deciding the necessity of renewal of said medium by said buffer blocks;
renewing means for continuously updating said blocks of the drive by said buffer blocks corresponding to at least a single operation, when said renewal is regarded as necessary; and
a sequencing means for each said drive of said plurality of drives sequentially and preventing said renewal from occurring simultaneously in two drives;
wherein said sequencing means sequences renewal of each drive within each fixed time cycle based on a fixed clock.

* * * * *